United States Patent
Kim et al.

(10) Patent No.: US 9,673,490 B2
(45) Date of Patent: Jun. 6, 2017

(54) METHOD AND SYSTEM FOR COOLING SECONDARY BATTERY

(71) Applicant: LG CHEM, LTD., Seoul (KR)

(72) Inventors: Bo Hyun Kim, Daejeon (KR); Jong Hyun Chae, Daejeon (KR); Dae il Kim, Daejeon (KR); Joong Min Lee, Daejeon (KR); Han Ho Lee, Seoul (KR)

(73) Assignee: LG CHEM, LTD., Seoul (KR)

( * ) Notice: Subject to any disclaimer, the term of this patent is extended or adjusted under 35 U.S.C. 154(b) by 882 days.

(21) Appl. No.: 14/021,105

(22) Filed: Sep. 9, 2013

(65) Prior Publication Data

US 2014/0000846 A1    Jan. 2, 2014

Related U.S. Application Data

(63) Continuation of application No. 13/451,184, filed on Apr. 19, 2012, now abandoned, which is a
(Continued)

(30) Foreign Application Priority Data

Dec. 20, 2010    (KR) .................. 10-2010-0130642

(51) Int. Cl.
*H01M 10/50*    (2006.01)
*F28D 15/00*    (2006.01)
(Continued)

(52) U.S. Cl.
CPC ....... *H01M 10/5004* (2013.01); *H01M 2/202* (2013.01); *H01M 2/30* (2013.01);
(Continued)

(58) Field of Classification Search
None
See application file for complete search history.

(56) References Cited

U.S. PATENT DOCUMENTS

| 4,600,665 A | 7/1986 | Sanders |
|---|---|---|
| 2006/0060236 A1 | 3/2006 | Kim |

(Continued)

FOREIGN PATENT DOCUMENTS

| CN | 101728596 A | 6/2010 |
|---|---|---|
| CN | 101894964 A | 11/2010 |

(Continued)

OTHER PUBLICATIONS

International Search Report, dated Apr. 26, 2012, for International Application No. PCT/KR2011/009447.
(Continued)

*Primary Examiner* — Ula C Ruddock
*Assistant Examiner* — Matthew Van Oudenaren
(74) *Attorney, Agent, or Firm* — Birch, Stewart, Kolasch & Birch, LLP

(57) ABSTRACT

Provided are a method and system for rapidly cooling a lithium secondary battery. A conductive connector is connected to at least one of positive and negative electrode terminals of a lithium secondary battery, and the conductive connector is brought into contact with a coolant to cool battery cells. The coolant may be water or air and may flow a coolant tube formed of a synthetic resin. An end of the coolant tube is fixed to at least one of the positive and negative electrode terminals. Therefore, owing to a cooling means disposed at a side of the lithium secondary battery, the temperature of the lithium secondary battery can be prevented from increasing to a preset value due to abnormal heating, and thermal stability of the lithium secondary battery can be improved by rapid cooling.

8 Claims, 3 Drawing Sheets

Related U.S. Application Data continuation of application No. PCT/KR2011/009447, filed on Dec. 8, 2011.

(51) Int. Cl.

| | | |
|---|---|---|
| H01M 10/613 | (2014.01) | |
| H01M 2/20 | (2006.01) | |
| H01M 2/30 | (2006.01) | |
| H01M 10/0525 | (2010.01) | |
| H01M 10/625 | (2014.01) | |
| H01M 10/6553 | (2014.01) | |
| H01M 10/6556 | (2014.01) | |
| H01M 10/6568 | (2014.01) | |
| H01M 10/60 | (2014.01) | |
| H01M 10/6552 | (2014.01) | |

(52) U.S. Cl.
CPC ..... *H01M 10/0525* (2013.01); *H01M 10/613* (2015.04); *H01M 10/625* (2015.04); *H01M 10/6553* (2015.04); *H01M 10/6556* (2015.04); *H01M 10/6568* (2015.04); *H01M 10/60* (2015.04); *H01M 10/6552* (2015.04); *Y02T 10/7011* (2013.01)

(56) References Cited

U.S. PATENT DOCUMENTS

| | | |
|---|---|---|
| 2009/0061305 A1 | 3/2009 | Nishida et al. |
| 2009/0142628 A1 | 6/2009 | Okada et al. |
| 2011/0212356 A1* | 9/2011 | Tennessen ............ F28F 1/022 429/120 |
| 2012/0183823 A1 | 7/2012 | Von Borck et al. |
| 2012/0188714 A1 | 7/2012 | Von Borck et al. |

FOREIGN PATENT DOCUMENTS

| | | | |
|---|---|---|---|
| DE | 10 2009 018 787 A1 | | 10/2010 |
| GB | 714 824 | | 9/1954 |
| GB | 776 240 | | 6/1957 |
| JP | 56-126270 A | | 10/1981 |
| JP | 2006-93155 A | | 4/2006 |
| JP | 2006-210245 A | | 8/2006 |
| JP | 2009-37934 A | | 2/2009 |
| JP | 2009-59473 A | | 3/2009 |
| JP | 2009-134938 A | | 6/2009 |
| JP | 2009-176917 A | | 8/2009 |
| JP | 2010-118239 A | | 5/2010 |
| JP | 2010-220403 A | | 9/2010 |
| JP | 2011029103 | * | 2/2011 |
| KR | 2001-0066740 A | | 7/2001 |
| WO | WO 2009/060697 A1 | | 5/2009 |

OTHER PUBLICATIONS

European Search Report issued on Aug. 5, 2016 for Application 11851570.9.

* cited by examiner

METHOD AND SYSTEM FOR COOLING SECONDARY BATTERY

CROSS-REFERENCE TO RELATED APPLICATIONS

This application is a Continuation of U.S. application Ser. No. 13/451,184, filed Apr. 19, 2012, which is a Continuation of International Application No. PCT/KR2011/009447 filed on Dec. 8, 2011, which claims priority from Korean Patent Application No. 10-2010-0130642 filed in Republic of Korea on Dec. 20, 2010, the entire contents of which are incorporated herein by reference.

BACKGROUND OF THE INVENTION

The present disclosure disclosed herein relates to a secondary battery for devices such as a portable electric/electronic device, a hybrid electric vehicle (HEV), and an electric vehicle (EV), and more particularly, to a method and system for rapidly cooling a secondary battery.

Recently, various compact and light electric/electronic devices such as cellular phones, laptop computers, and camcorders are developed and produced. Such portable electric/electronic devices are provided with battery modules for operation without external supply of power. Such a battery module includes at least one battery capable of maintaining its output voltage level greater than a predetermined value for operating an electric/electronic device for a predetermined time period.

Many recent battery modules are constituted by rechargeable second batteries due to economic reasons. Particularly, lithium secondary batteries are widely used in various mobile devices and electronic devices as power sources owing to high energy density, high operating voltage, and long lifespan.

In addition, lithium secondary batteries are receiving considerable attention as energy sources for electric vehicles and hybrid electric vehicles which are alternatives for gasoline vehicles and diesel vehicles causing pollution and global warming due to use of fossil fuel. Some lithium secondary batteries are commercially available for that purpose.

Since lithium secondary batteries have an operating voltage of 3.6 V, which is three times the operating voltage of nickel-cadmium batteries or nickel-hydride batteries that are widely used as power sources of portable electric devices, and have high energy density per unit weight, the use of lithium secondary batteries is rapidly increasing.

Generally, according to the kinds of electrolytes, lithium secondary batteries are classified into a liquid electrolyte type and a polymer electrolyte type. Liquid electrolyte type lithium secondary batteries are called lithium ion secondary batteries, and polymer electrolyte type lithium secondary batteries are called lithium polymer secondary batteries. In addition, secondary batteries can be classified into a cylindrical type, a prismatic type, and a pouch type according to external and internal structures. Since pouch type secondary batteries can have a high stacking density and a narrow width relative to a length and are light, much attention is being paid to pouch type secondary batteries.

Usually, lithium secondary batteries use lithium-containing oxides as positive electrode active materials and carbon materials as negative electrode active materials. For example, a lithium secondary battery includes an electrode assembly, a secondary battery case accommodating the electrode assembly, and an electrolyte injected in the secondary battery case to allow movement of lithium ions. The electrode assembly includes a positive electrode plate coated with a positive electrode active material, a negative electrode plate coated with a negative electrode active material, and a separator disposed between the positive and negative electrode plates to prevent an electric short circuit while allowing movement of lithium ions therethrough. The electrode assembly is formed by winding the positive electrode, the separator, and the negative electrode.

In detail, a positive electrode terminal is connected to the positive electrode plate coated with a positive electrode active material, and a negative electrode terminal is connected to the negative electrode plate coated with a negative electrode active material. That positive electrode plate, the separator, and the negative electrode plate are stacked on one another and are wound to form the electrode assembly.

Then, the electrode assembly is fixedly disposed in the secondary battery case, and the electrolyte is injected into the secondary battery case. After that, the secondary battery case is sealed.

In such battery modules including a plurality of rechargeable unit cells, safety is one of the most important factors. Safety problems of battery modules are caused by heating, external impacts, deterioration of internal components, short circuits, etc.

That is, although a high cell density can be obtained by stacking a plurality of cells, it is difficult to dissipate heat generating from the cells when the cells are charged and discharged. If heat is accumulated due to poor heat dissipation, a significant safety problem may arise as well as deterioration and lifespan reduction of a battery. Particularly, effective heat dissipation is more important for power sources of electric vehicles and hybrid vehicles because such power sources are rapidly charged and discharged and a large amount of heat is generated during a momentary high power operation.

In other words, if heat is not effectively dissipated while unit cells are charged and discharged, heat accumulates to deteriorate the unit cells. In some cases, burning or explosion may arise. Therefore, a cooling system is necessary.

In the related art, a heat sink is attached to one side of a secondary battery including a positive electrode, a separator, and a negative electrode that are stacked many times, so as to absorb and dissipate heat generated from the secondary battery. However, the rate of heat transfer to the heat sink is low because heat is transferred through a plurality of layers of positive electrode/separator/negative electrode. Thus, cooling is not rapidly carried.

SUMMARY OF THE INVENTION

The present invention provides a method and system for cooling a lithium secondary battery by disposing a cooling means at a side of the lithium secondary battery to prevent the temperature of the lithium secondary battery from increasing to a preset value due to abnormal heating and improve thermal stability of the lithium secondary battery.

Embodiments of the present invention provide methods for cooling a lithium secondary battery including an electrode terminal, the methods including: connecting a conductive connector to the electrode terminal; and bringing a coolant into contact with the connector to cool a battery cell.

In other embodiments of the present invention, there are provided systems for cooling a lithium secondary battery including an electrode terminal, the systems including: a conductive connector fixed to the electrode terminal; and a coolant tube connected to the conductive connector and allowing a flow of a coolant therethrough.

In some embodiments, the connector may include: a body; a fixing part formed on a side of the body for being fixed to the electrode terminal; and a connection part formed on the other side of the body for connection with the coolant tube.

In other embodiments, the connector may include: a body configured to be fixed to the electrode terminal; and a connection part inserted in the body and configured to be connected to the coolant tube.

In still other embodiments, the fixing part may be fixed to the electrode terminal by welding.

In even other embodiments, the coolant may be a fluid such as water or air, and the coolant tube may be formed of a synthetic resin. However, the present invention not limited thereto.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Hereinafter, a method and system for cooling a secondary battery will be described in detail with reference to the accompanying drawings according to exemplary embodiments of the present invention.

The term "secondary battery" used herein refers to a unit battery or a battery module formed by stacking two or more unit batteries. The term "battery module" used herein includes a battery system formed by mechanically and electrically connecting one or more unit batteries to provide high-power, high-capacity electricity system. For example, a battery module may constitute a standalone power source or be included in a large apparatus. For example, a plurality of batter modules may be connected to constitute a battery pack.

A battery module may be constituted by stacking one or more unit batteries as described above. In addition, a battery module may be constituted by: disposing one or more unit batteries in a cartridge in a state where most outer surfaces of the unit batteries are exposed; and stacking such cartridges. Particularly, in the case of constituting a battery module using pouch batteries, the pouch batteries may be disposed in cartridges to form the battery module because the pouch batteries are not mechanically rigid and are difficult to connect electrode terminals thereof.

Unit cells constituting a battery module (particularly, a medium or large battery module) are rechargeable battery cells. The present invention can be applied to any kinds of rechargeable unit cells (secondary battery cells). For example, the present invention can be applied to lithium secondary batteries, nickel-metal hydride (Ni-MH) secondary batteries, and nickel-cadmium (Ni—Cd) secondary batteries. The present invention may be effectively applied to lithium secondary batteries having high output power relative to weight thereof. In addition, the present invention may be effectively applied to prismatic batteries and pouch batteries. For example, the present invention may be more effectively applied to pouch batteries which are light and can be manufactured with low costs.

While secondary batteries operate, heat is inevitably generated. If such heat is not efficiently dissipated, unit cells may be thermally deteriorated, and in some cases, unit cells may burn or explode.

Therefore, according to the present invention, it is configured such that heat is transferred through at least one of positive and negative electrode terminals for rapidly cooling battery cells. In the present invention, battery cells are cooled using air or coolant.

That is, in a battery, heat is transferred to positive and negative electrode terminals and is dissipated through a connector connected to one or both of the positive and negative electrode terminals. The connector is in contact with air or water for rapid cooling.

Figure 1:
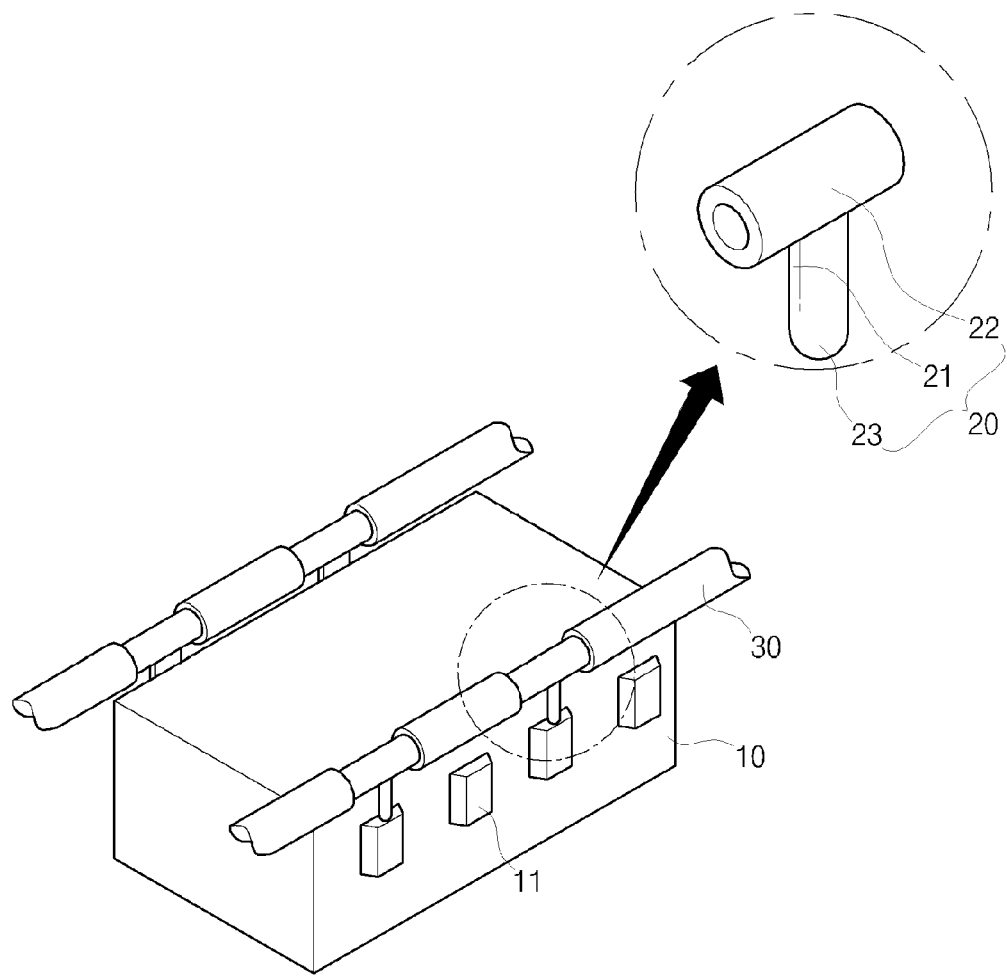
FIG. 1 is a schematic view illustrating a system for cooling a secondary battery according to a first embodiment of the present invention.
Figure 2:
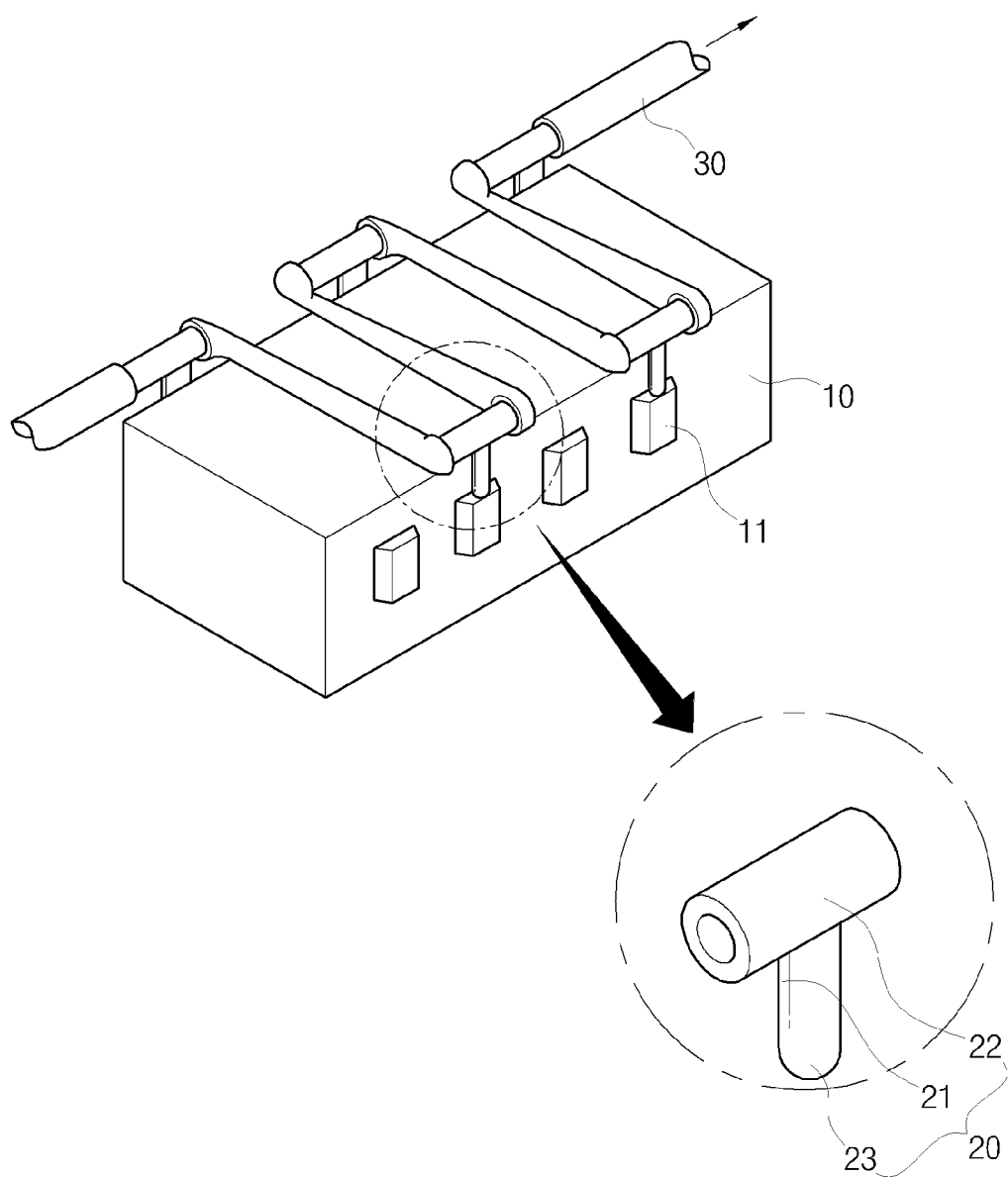
FIG. 2 is a schematic view illustrating the system for cooling a secondary battery according to a second embodiment of the present invention.
Figure 3:
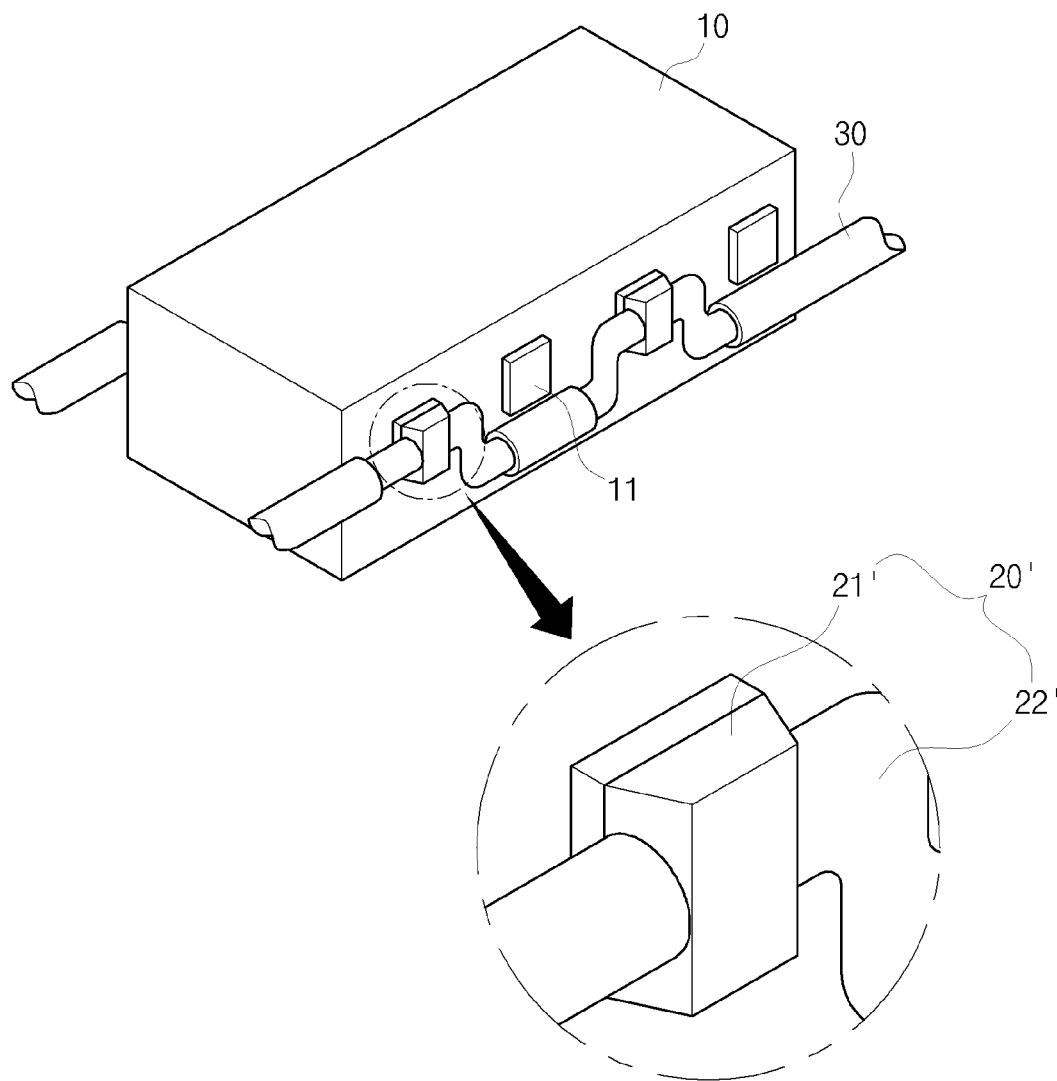
FIG. 3 is a schematic view illustrating the system for cooling a secondary battery according to a third embodiment of the present invention.

A cooling system for implementing the above described cooling method is illustrated in FIGS. 1 to 3.

As shown in FIGS. 1 to 3, the cooling system includes: conductive connectors 20 having ends fixed to electrode terminals 11 of a lithium secondary battery 10; and coolant tubes 30 connected to the connectors 20 for dissipating heat transferred from the secondary battery 10 to the connectors 20.

In the embodiments of the present invention, the secondary battery 10 includes pouch unit cells each including an electrode assembly of positive electrode/separator/negative electrode. The electrode assemblies are disposed in a cell case and are connected to the electrode terminals 11 disposed on the outer surface of the cell case.

That is, the electrode terminals 11 (positive and negative electrode terminals) are electrically connected to the electrode assemblies and protrude from the outer surface of the cell case. The electrode terminals 11 may protrude and be arranged along one side, the other side, or both sides of the cell case.

The connectors 20 may be formed of any material as long as heat transferred from the cells of the secondary battery 10 to the electrode terminals 11 can be transferred to the coolant tubes 30 through the connectors 20. For example, the connectors 20 may be formed of a highly conductive metal for rapid heat transfer.

In detail, the highly conductive metal may include at least one selected from the group consisting of copper (Cu), aluminum (Al), platinum (Pt), gold (Au), nickel (Ni), zinc (Zn), cobalt (Co), iron (Fe), and alloys thereof. However, the highly conductive metal is not limited thereto.

As shown in FIGS. 1 and 2, each of the connectors 20 may include: a body 21 having a predetermined length; a fixing part 23 formed on a side of the body 21 so that the electrode terminal 11 can be fixedly connected to the fixing part 23; a connection part 22 formed on the other side of the body 21 for connection with the coolant tube 30.

The fixing part 23 may be fixedly connected to the electrode terminal 11 by welding for reliable fixing and heat transfer.

The connection part 22 extends in a direction crossing the body 21. That is, the connector 20 has a T-shape, and the connection part 22 extending from both sides of the body 21 is connected to the coolant tubes 30 for making contact with a coolant.

Referring to FIG. 3, a simple connector 20' is illustrated. The connector 20' includes a body 21' and a connection part 22' inserted through the body 21'. Thus, the body 21' can be directly fixed to the electrode terminal 11 by welding without the above-described fixing part 23.

In the case of the connector 20' having a simple structure, a distance from the electrode terminal 11 to the coolant tube 30 can be reduced to enhance the heat transfer effect. That is, the battery cells can be cooled more rapidly.

Each of the coolant tubes 30 are hollow so that air or a coolant such as water can flow in the coolant tubes 30. It is necessary to firmly connect the coolant tube 30 to the connector 20 to prevent leakage of coolant. For example, the coolant tube 30 may be connected to the connector 20 using an additional sealing material such as an O-ring or sealing liquid. The coolant tube 30 may have a straight shape as shown in FIGS. 1 and 3 or a zigzag shape as shown in FIG. 2. In the latter case, a coolant flowing time may be increased in a limited space so that the battery cells may be cooled more efficiently.

If the coolant tube 30 is formed of a highly conductive material, the secondary battery 10 may be short-circuited when the temperature of the secondary battery 10 is steeply increased. Such a short circuit may a dangerous situation such as an explosion of the secondary battery 10. Therefore, the coolant tube 30 may be formed of a material such as a synthetic resin for preventing a short circuit and recuing the weight of the coolant tube 30.

For example, the coolant tube 30 may be formed of a synthetic resin selected from the group consisting of polychloroprene rubber, acrylonitrile-butadiene copolymer rubber, acrylic rubber, nitrile-butadiene rubber, and mixtures thereof. However, the coolant tube 30 is not limited thereto.

A coolant flows in the coolant tube 30. Any kind of coolant can be used as long as the coolant can flow in the coolant tube 30 for dissipating heat from the battery cells. The coolant may be air or water.

According to the kind of the coolant, a driving unit for circulating the coolant may be determined. For example, if the coolant is air, a cooling fan and a motor may be used.

As described above, if a plurality of unit cells are stacked in a battery module, although the battery module has a high cell density, it is necessary to effectively dissipate heat generated from the unit cells while the unit cells are charged and discharged. Thus, according to the present invention, heat generated from battery cells is transferred to a coolant through electrode terminals so that the battery cells can be rapidly and effectively cooled while being charged and discharged. Therefore, thermal deterioration of the battery cells can be prevented.

According to the present invention, a cooling means is disposed at a side of a lithium secondary battery to prevent the temperature of the lithium secondary battery from increasing to a preset value due to abnormal heating and improve thermal stability of the lithium secondary battery by rapid cooling.

In addition, according to the present invention, since a cooling means is disposed at a side of a lithium secondary battery, additional cooling fins are not necessary.

In addition, although a plurality of unit cells are in a secondary battery densely or in contact with each other, overheating of the secondary battery can be prevented.

Therefore, according to the present invention, the volume of a secondary battery can be reduced as compared with the related art.

What is claimed is:

1. A method for cooling a lithium secondary battery including an electrode terminal, the method comprising:
    connecting a conductive connector to the electrode terminal; and
    bringing a coolant into contact with the conductive connector to cool a battery cell,
    wherein the conductive connector is connected to a coolant tube in which the coolant flows,
    wherein a coolant flow line formed by connecting the conductive connector and the coolant tube has one straight direction, and
    wherein the conductive connector comprises:
        a body having a first end, a second end and a longitudinal axis extending between the first end and second end;
        a fixing part formed on the first end of the body for connection to the electrode terminal; and
        a connection part formed on the second end of the body, the connection part being hollow and having a longitudinal axis perpendicular to the longitudinal axis of the body.

2. A system for cooling a lithium secondary battery including an electrode terminal, the system comprising:
    a conductive connector fixed to the electrode terminal; and
    a coolant tube connected to the conductive connector and allowing a flow of a coolant therethrough,
    wherein a coolant flow line formed by connecting the conductive connector and the coolant tube has one straight direction, and
    wherein the conductive connector comprises:
        a body having a first end, a second end and a longitudinal axis extending between the first end and second end;
        a fixing part formed on the first end of the body for connection to the electrode terminal; and
        a connection part formed on the second end of the body, the connection part being hollow and having a longitudinal axis perpendicular to the longitudinal axis of the body.

3. The system of claim 2, wherein the fixing part is fixed to the electrode terminal by welding.

4. The system of claim 2, wherein the coolant is a fluid.

5. The system of claim 4, wherein the coolant is water or air.

6. The system of claim 2, wherein the coolant tube is formed of a synthetic resin.

7. The system of claim 6, wherein the synthetic resin comprises at least one selected from the group consisting of polychloroprene rubber, acrylonitrile-butadiene copolymer rubber, acrylic rubber, nitrile-butadiene rubber, and mixtures thereof.

8. The system of claim 2, wherein the conductive connector comprises at least one selected from the group consisting of copper (Cu), aluminum (Al), platinum (Pt), gold (Au), nickel (Ni), zinc (Zn), cobalt (Co), iron (Fe), and alloys thereof.

* * * * *